(No Model.)

E. RIVETT.
SCREW DRIVER.

No. 453,211. Patented June 2, 1891.

WITNESSES:
Alice A. Perkins
Geo. W. White

INVENTOR:
Edward Rivett.
by Alban Andrew
his atty.

THE NORRIS PETERS CO., PHOTO-LITHO., WASHINGTON, D. C.

UNITED STATES PATENT OFFICE.

EDWARD RIVETT, OF BOSTON, MASSACHUSETTS.

SCREW-DRIVER.

SPECIFICATION forming part of Letters Patent No. 453,211, dated June 2, 1891.

Application filed July 28, 1890. Serial No. 360,171. (No model.)

*To all whom it may concern:*

Be it known that I, EDWARD RIVETT, a citizen of the United States, and a resident of Boston, in the county of Suffolk and State of Massachusetts, have invented new and useful Improvements in Screw-Drivers, of which the following, taken in connection with the accompanying drawings, is a specification.

This invention relates to improvements in screw-drivers, and it is particularly well adapted for watch-makers' use, although it may be equally useful to other artisans for the purpose of manipulating and adjusting small screws, as will hereinafter be more fully shown and described, reference being had to the accompanying drawings, wherein—

Figure 1:
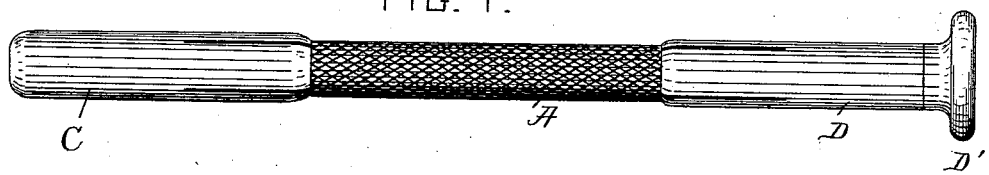
Figure 2:
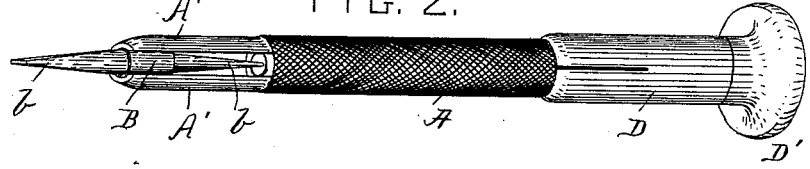
Figure 3:
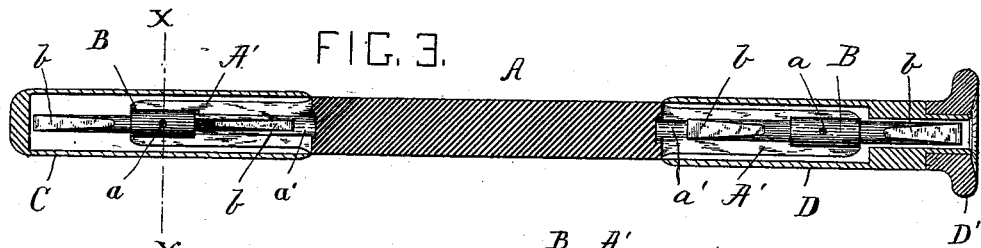
Figure 4:
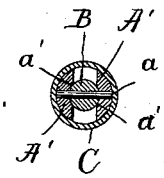
Figure 5:
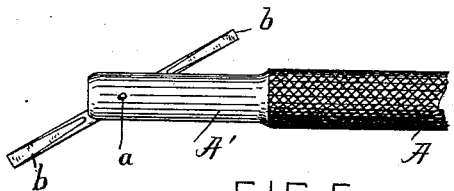

Figure 1 represents a side elevation of the invention, showing both of its ends capped when not in use. Fig. 2 represents a perspective view of the same with one of its ends uncapped and ready for use. Fig. 3 represents a central longitudinal section of Fig. 1. Fig. 4 represents a cross-section on the line X X shown in Fig. 3; and Fig. 5 represents a partial side view of the tool, showing the manner of adjusting the screw-driver blades.

The figures are drawn on an enlarged scale.

Similar letters refer to similar parts wherever they occur on the different parts of the drawings.

The invention is designed as a convenient tool, which may most conveniently be carried in the pocket to be ready for use whenever needed, and it is constructed as follows: It is composed of a shank A, preferably grooved or serrated, as shown in the drawings. The said shank is provided at its ends with forked and laterally-expansive jaws A' A', having longitudinal grooves $a'$ $a'$ on their insides, adapted to receive and hold temporarily in place a screw-driver shank B, which is pivoted at $a$ to and between said expansive jaws A' A', as shown in Figs. 2, 3, 4, and 5. The shank B has at its opposite ends and made in one piece with it the screw-driver blades $b$ $b$, preferably made varying in size, as shown, so as to permit the tool to be used for different sizes of screws. If it is desired to change the size of the blade that is being used, it is only necessary to turn the shank B and its blades $b$ $b$ half a revolution on the pivot-pin $a$, when the shank B will again be locked in working position between the grooved jaws A' A', as shown in Figs. 2, 3, and 4.

C is a slitted expansive cap adapted to be placed over and around either of the forked ends of the tool to enable it to be carried conveniently in a pocket, if so desired. D is a similar slitted expansive cap having journaled to its outer end the swivel-head D', as shown in Figs. 1, 2, and 3. The caps C and D are interchangeable and may be placed on either end of the tool, according to the blade that is being used. If so desired, I may make both caps alike—namely, like the one shown at C or D in Figs. 1 and 3—without departing from the spirit of my invention; but in practice I prefer to provide one of said caps with a swivel-head, as shown and described.

When the tool is not in use, the caps C and D are placed in position thereon, as shown in Fig. 1, in which condition it may be most conveniently carried in the pocket.

In using the tool the cap C is removed and the shank A is held and turned, preferably by the thumb and second finger, while downward pressure may be exerted on the tool by placing the first finger on the swivel D' and pressing downward in the ratio as the screw advances. The tool may, however, be used in any other convenient manner, as may be desired, without departing from the essence of my invention. By turning the screw-driver blades half a revolution or by changing the cap D from one end of the tool to the other four different sizes of tools are obtained, either of which may be used, according to the nature of the work to be done.

Having thus fully described the nature, construction, and operation of my invention, I wish to secure by Letters Patent and claim—

The herein-described screw-driver, consisting of a shank or handle having laterally-expansive forked jaws at its ends, and reversible tools pivoted to and between said jaws, combined with a detachable cap adapted to cover and inclose one of said reversible tools and having a swiveled head connected to its outer end, substantially as and for the purpose set forth.

In testimony whereof I have signed my name to this specification, in the presence of two subscribing witnesses, on this 12th day of July, A. D. 1890.

EDWARD RIVETT.

Witnesses:
ALBAN ANDRÉN,
ALICE A. PERKINS.